June 5, 1956     W. EISENMAN ET AL     2,749,273
THIOAURIN, ITS PRODUCTION AND RECOVERY
Filed Sept. 17, 1952
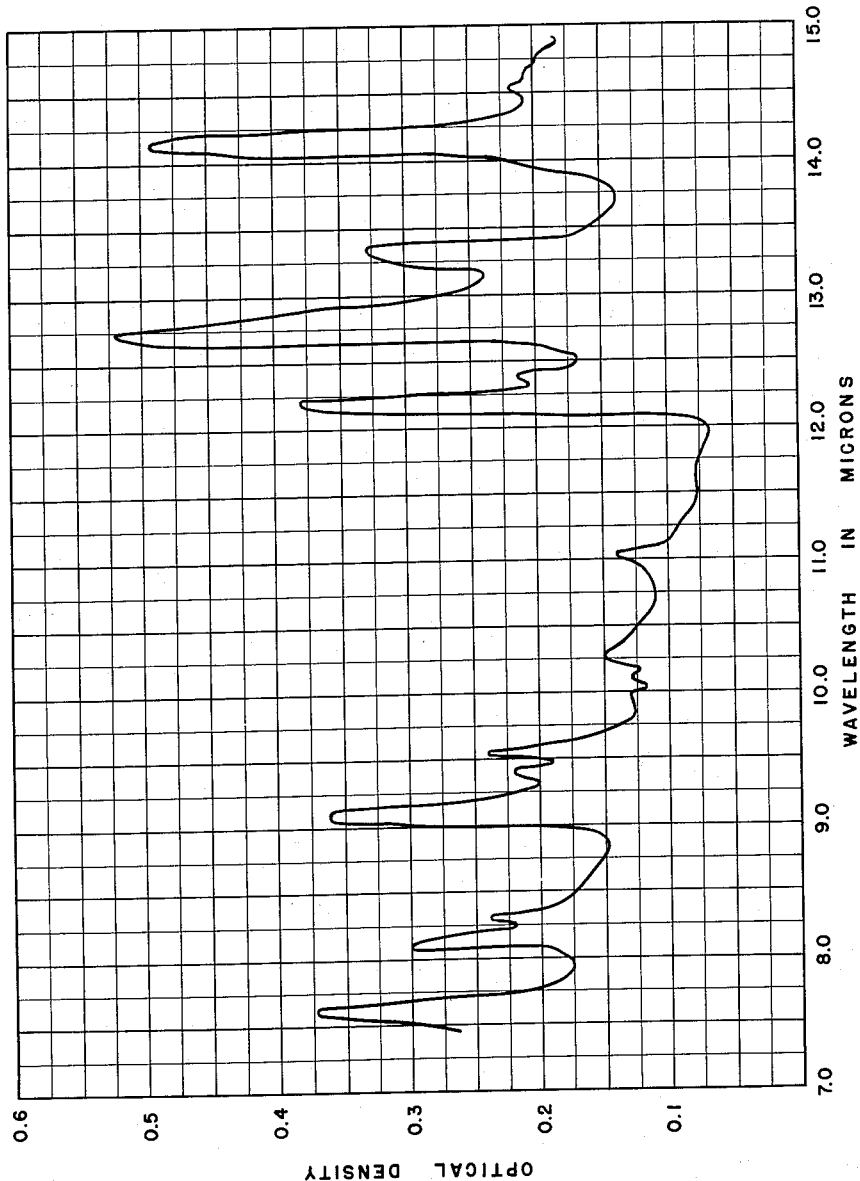
INVENTOR
WILLIAM EISENMAN
PASQUALE P. MINIERI
ATTORNEY

United States Patent Office 2,749,273
Patented June 5, 1956

2,749,273

THIOAURIN, ITS PRODUCTION AND RECOVERY

William Eisenman, New York, and Pasquale Paul Minieri, Brooklyn, N. Y., assignors, by mesne assignments, to American Cyanamid Company, New York, N. Y., a corporation of Maine Application September 17, 1952, Serial No. 310,018

4 Claims. (Cl. 167—65)

The present invention relates to a new and useful antibiotic and to its production and to its separation or purification. The new antibiotic will hereinafter be referred to as thioaurin for the sake of brevity.

Thioaurin is produced during the cultivation or fermentation of a previously undescribed microorganism isolated from a soil sample collected in the State of Oregon. The microorganism is a species of Streptomyces.

A culture of the living thioaurin-producing organism has been deposited with the Northern Regional Research Laboratory at Peoria, Illinois, where the thioaurin-producing organism has been added to the permanent collection of microorganisms and assigned the distinguishing number NRRL–2294.

The present invention is concerned with and embraces thioaurin in pure crystalline form in dilute solutions and in crude concentrates. The invention also embraces the process of growing the previously undescribed thioaurin-producing organism which is a species of Streptomyces under aerobic conditions and mutants or variants of the species also producing thioaurin.

As will become apparent, the characteristics of thioaurin are such as to distinguish it from previously described antibiotics including those antibiotics which are the metabolic products of other species of previously described Streptomyces. The characteristics of the thioaurin-producing organism are such as to distinguish it from other antibiotic producing organisms.

The newly isolated organism is a species of Steptomyces, some of which species are described in Bergey's Manual of Determinative Bacteriology, 6th edition. However, the present microorganism does not follow the description of any one of the species of Streptomyces in this reference and is readily distinguishable therefrom.

The growth characteristics of the present organism on various slants is as follows:

Czapek-Dox—good flat growth, pinkish surface.
Calcium malate—good growth with white aerial hyphae.
Nutrient glucose—good growth, half white surface, half translucent.
Gelatine—liquefaction of gelatine good but incomplete.

The organism grows with straight branching mycelium with little or no spirals. The spores are produced in chains either spherical or round. Different isolates and strains or mutants of the organism producing thioaurin vary somewhat in their cultural growth characteristics. The first one isolated produces little or no soluble pigment, while another strain produces a dark soluble pigment on those media containing natural substances. Some strains produce aerial hyphae on only certain media, while others develop aerial hyphae on different media.

The cultural characteristics of several isolates of this organism are presented below in tabular form. The characteristics are those characteristics occurring during growth on the media mentioned. The composition of the media is given in "The Actinomycetes" by S. A. Waksman, Chronica Botanica, Waltham, Mass., 1950, except as noted.

| Isolate Number | 8 | 9 | 12 | 13 |
|---|---|---|---|---|
| Litmus Milk: | | | | |
| Alkaline | yes | yes | yes | yes. |
| Clearing | yes | yes | yes | yes. |
| Peptonization | no | no | no | no. |
| Coagulation | no | no | no | no. |
| Glucose Broth | acid | acid | acid | acid. |
| Lactose Broth | acid | acid | acid | acid. |
| Glycerin Broth | no acid | no acid | no acid | no acid. |
| Sucrose Broth | no acid | no acid | no acid | no acid. |
| Gelatin Stab: | | | | |
| Pigment | black | none | black | none. |
| Liquefaction | partial | slight | partial | slight. |
| Starch Agar | white hyphae | pink hyphae | gray hyphae | pink hyphae. |
| Hydrolysis | yes | yes | yes | yes. |
| Calcium Malate Agar: | | | | |
| Pigment | yellow | none | yellow | none. |
| Hyphae | white | white | gray | white. |
| Czapek-Dox Agar: | | | | |
| Pigment | none | none | yellow | none. |
| Hyphae | none | pink | gray | pink. |
| Glycerin Asparagin: | | | | |
| Pigment | yellow | brown | yellow | gray. |
| Hyphae | white | pink | gray | white. |
| Emerson Agar: | | | | |
| Pigment | brown | none | brown | yellow. |
| Hyphae | none | white | gray | white. |
| Asparagin Meat Extract Agar:[1] | | | | |
| Pigment | yellow | brown | yellow | none. |
| Hyphae | white | pink | gray | pink. |
| Nutrient Glucose:[2] | | | | |
| Pigment | brown | none | brown | none. |
| Hyphae | none | white | white | white. |

[1] Duggar. U. S. Patent 2,482,055.
[2] Nutrient glucose.

Thioaurin is both an antibacterial and an antifungal substance and is active against both gram negative and gram positive bacteria, including the following: *Staphylococcus aureus, Sarcina lutea, Bacillus subtilis, Escherichia coli, Aerobacter aerogenes, Proteus vulgaris, Klebsiella pneumoniae, Salmonella schotmulleri, Eberthella typhosa,* and *Mycobacterium tuberculosis.*

In the process of producing thioaurin, growth from slants was inoculated into flasks containing a synthetic medium of the following composition made up to one liter with water:

| | G. |
|---|---|
| Glucose | 15 |
| NaCl | 5 |
| Sodium citrate | 1 |
| Acetic acid | .5 |
| $(NH_4)_2SO_4$ | 3.3 |
| $MgSO_4 \cdot 7H_2O$ | 0.25 |
| $K_2HPO_4$ | .1 |
| $KH_2PO_4$ | .1 |
| $CaCO_3$ | 3 |

Trace elements were added as $MnSO_4 \cdot 4H_2O$ 10 p. p. m.; $ZnSO_4 \cdot 7H_2O$ 40 p. p. m.; and $K_2Cr_2O_7$ 0.016 p. p. m. The flasks were then placed on a reciprocating shaker and shaken for about 48 hours at 26° C.

The crude broth obtained after filtration had activity against *E. coli* in nutrient broth at a dilution of 1/256 in a serial dilution assay when the tubes were read at 4 hours and 1/100 when read at 24 hours at 26° to 28° C. The broth had an activity against *Proteus vulgaris* at 1/75 and *Pseudomonas aeruginosa* at 1/8.

Thioaurin is a solid and is obtained in the more highly purified forms which have been dried in vacuo for 24 hours at 50° C. as yellow needles which melt (capillary) with darkening at 175°–177° C. The melting point also has been determined on a Kofler hot stage. In this determination a few crystals were placed on a microscope slide and then heated rapidly on the hot stage to 170° C. At this temperature the sample started to sublime and a yellow halo formed around each crystal. The sample started to melt at 176° C. and was completely melted at 180° C. However, the majority of the crystals melted in the range of 178°–180° C. On melting this sample apparently decomposed because the liquid melt turned very dark red in color and would not resolidify on cooling.

Thioaurin is relatively insoluble in water with only about 0.25 milligram being dissolved per milliliter at 28° C. It is fairly soluble in methanol but only slightly soluble in ethyl acetate and can be conveniently recrystallized from the latter solvent. Thioaurin also can be recrystallized from benzene. The solubility in chloroform is less than one milligram per milliliter.

Thioaurin may be readily and completely extracted from fermentation broths by water immiscible organic solvents, for example, n-butanol, ethyl acetate, chloroform, and methyl isobutyl ketone. When benzene or diethyl ether was used in amounts equal to the amount of culture fluid there was no apparent extraction of thioaurin. The distribution from water into the above organic solvents does not seem to be affected by the pH value of the thioaurin containing aqueous solutions or suspensions. However, the distribution into such solvents can be increased by the addition of inorganic, soluble salts such as sodium chloride, sodium sulfate, and ammonium sulfate to aqueous solutions of thioaurin prior to extraction.

Thioaurin can be distinguished from other antibiotics including those antibiotics produced by microorganisms which are species of Streptomyces, by Craig countercurrent distribution studies. This technique is described in Craig, L. C., Journal Biological Chemistry, vol. 150, page 33 (1943). For example, when thioaurin was distributed in a 49-plate Craig apparatus using the system ethyl acetate-water at pH 6, the highest concentration of thioaurin was found in tube 25. In the case of chloroamphenicol, acetopyrrothine, chlortetracycline, and oxytetracycline, distribution in the same system showed that the highest concentration for each of these was found in tubes 47, 41, 23, and 7, respectively. In the system ethyl acetate-3% aqueous acetic acid the corresponding tube numbers were 46, 41, 25, 7, and 3 for chloroamphenicol, thioaurin, acetopyrrothine, chlorotetracycline, and oxytetracycline, respectively. It can be seen from the results of such studies that the distribution of both chlortetracycline, and oxytetracycline is affected by the presence of acetic acid, whereas the distribution of the other three is not affected. As both chloroamphenicol and acetopyrrothine are neutral substances, thioaurin apparently with respect to its countercurrent distribution behavior should be classified as a neutral substance. Other evidence that this substance is a neutral compound was obtained when an aqueous solution was titrated with sodium hydroxide. The titration was followed by pH and photometric measurements. No strongly basic or acidic groups were detected.

Thioaurin has been differentiated from some of the more common antibiotics by means of paper chromatography. The behavior of chloroamphenicol, chlortetracycline, oxytetracycline, and thioaurin has been studied in two papyrographic systems, and the results are presented in the following table. The use of such systems is well-known in the antibiotic field and is described by R. Consden et al. in the Biochemical Journal, vol. 38, page 224 (1944). Both of the present developments were carried out at room temperature for 28 hours. The active zones were detected using *B. subtilis* plates made up at pH 6.8.

| | RF | |
|---|---|---|
| | wet n-butanol | n-butanol: acetic acid: water (4:1:5) |
| Chloroamphenicol | 1.0 | 1.0 |
| Chlortetracycline | 0 to 0.6 | 0.67 |
| Oxytetracycline | 0 to 0.3 | 0.5 |
| Thioaurin | 0.7 to 0.79 | 0.7 to 0.79 |

The molecular weight (Rast) was determined as follows: 1.28 mg. of thioaurin and 12.0 mg. of camphor were sealed in a micro tube and melted. The resulting solid mixture gave an equilibrium melting point of 168.5°. Using 39.7 as the melting point constant for camphor the observed depression in the melting point corresponds to a molecular weight of 226.

A highly purified sample of thioaurin was found to contain the elements carbon, hydrogen, nitrogen, and sulfur.

Two elemental analyses on the same sample gave the following values (%).

Carbon _____ 39.26, 39.00, av. 39.13.
Hydrogen _____ 2.96, 2.86, av. 2.91.
Nitrogen (Dumas) _____ 12.09, 12.49, av. 12.29.
Sulfur _____ 30.09, 30.00, av. 30.05.
Oxygen (by difference) ____ 15.60, 15.65, av. 15.62.

In view of the elemental analyses and the molecular weight determination, the molecular formula of thioaurin apparently is $C_7H_6N_2O_2S_2$. This formula indicates an actual molecular weight of 214.

The same sample of purified thioaurin was tested for optical rotation. The specific rotation in glacial acetic acid was found to be:

$[\alpha]_D^{25°\,C.} = 0$ (0.75% (w./w.) in glacial acetic acid)

The ultraviolet adsorption spectra of 0.90 mg. of the same crystalline thioaurin tested for optical rotation was determined. The following data were obtained by measuring (Beckman quartz spectrophotometer, Model DU) the optical density of a solution of 0.90 milligram of thioaurin in 50.0 milliliters of methanol versus a methanol blank at various wavelengths.

| Wavelength, mu: | $E_1\%$ |
|---|---|
| 227 | 195 |
| 230 | 198 |
| 232 | 199 |
| 235 | 197 |
| 240 | 185 |

| Wavelength, mu: | $E_1\%$ |
|---|---|
| 245 | 167 |
| 250 | 145 |
| 260 | 103 |
| 270 | 79 |
| 275 | 71 |
| 280 | 70 |
| 285 | 71 |
| 290 | 77 |
| 300 | 86 |
| 310 | 90 |
| 320 | 103 |
| 330 | 148 |
| 340 | 247 |
| 350 | 374 |
| 360 | 485 |
| 365 | 512 |
| 368 | 520 |
| 370 | 518 |
| 375 | 507 |
| 380 | 471 |
| 390 | 366 |
| 400 | 246 |

The following minima and maxima values are shown in the above table:

$E_{1\ cm}^{1\%}$ at 280 mu = 70

$E_{1\ cm}^{1\%}$ at 368 mu = 520

In ethyl acetate the corresponding minima and maxima values were obtained:

$E_{1\ cm}^{1\%}$ at 283 mu = 77

$E_{1\ cm}^{1\%}$ at 370 mu = 430

Refractive index measurements on a sample of crystalline thioaurin gave the following values:

| | |
|---|---|
| Alpha | 1.595±0.005 |
| Beta | 1.725±0.005 |
| Gamma | >1.80 |

This lot contained needle-like crystals for the most part and some small rhomboid crystals. The alpha index of refraction vibrates parallel to the long direction of the crystal. Some of this material was recrystallized from benzene and the crystals so obtained showed the gamma index of refraction parallel to the long axis of the crystal. The crystals formed from benzene are probably orthorhombic and do have the same refractive indices as the needle-like crystals.

Thioaurin exhibited no fluorescence when crystalline material or a solution was exposed to radiation from a Woods lamp.

A suspension obtained by mulling thioaurin crystals in neutral mineral oil shows many characteristic absorption bands in the infra-red. The infra-red absorption spectrum of this mineral oil mull within the characteristic fingerprint region of wavelengths (microns) is shown in Figure 1 of the drawing. The exact location of the absorption peaks are as follows:

| Microns | Microns |
|---|---|
| 7.62 | 10.26 |
| 8.10 | 11.02 |
| 8.30 | 12.18 |
| 9.08 | 12.36 |
| 9.40 | 12.78 |
| 9.52 | 13.24 |
| 10.00 | 14.10 |
| 10.10 | 14.54 |

Thioaurin has both antibacterial and antifungal properties differing from those antibiotics produced by other previously described microorganisms. This new antibiotic is active against a wide variety of gram positive and gram negative bacteria. While the antibacterial spectrum of thioaurin is similar in some respects to that of other antibiotics produced by microorganisms which are species of Streptomyces, the spectrum of thioaurin is materially different in many respects.

Table I shows the relative amount of thioaurin required to inhibit various typical bacteria in comparison with the amounts of chlortetracycline, chloramphenicol, and oxytetracycline required to achieve the same results. The method used was the agar-dilution streak method of Waksman and Reilly (Ind. Eng. Chem. 17, 556–558 (1945)).

TABLE I

*Concentrations of antibiotic required to prevent growth of bacteria on the surface of agar plates*

| Test Organism | Chlortetracycline | Oxytetracycline | Thioaurin | Chloramphenicol |
|---|---|---|---|---|
| *37° C.* | mcg./ml. | mcg./ml. | mcg./ml. | mcg./ml. |
| S. aureus | 0.06 | 0.245 | 31.25 | 3.9 |
| B. subtilis | 0.06 | 0.245 | 31.25 | 1.95 |
| E. coli | 1.95 | 1.95 | 15.6 | 7.8 |
| A. aerogenes | 0.98 | 1.95 | 15.6 | 1.95 |
| P. vulgaris | 1.95 | 1.95 | 15.6 | 3.9 |
| Ps. aeruginosa | 15.6 | 15.6 | 62.5 | >125 |
| K. pneumoniae | 0.245 | 0.49 | 31.25 | 0.98 |
| S. schottmulleri | 0.98 | 1.95 | 15.6 | 1.95 |
| E. typhosa | 0.98 | 1.95 | 15.6 | 3.9 |
| M. tuberculosis | 0.03 | 0.245 | 15.6 | 3.9 |
| *26° C.* | | | | |
| S. aureus | | 0.061 | 7.8 | 0.98 |
| E. coli | 0.98 | 0.98 | 7.8 | 7.8 |
| A. aerogenes | 0.245 | 0.49 | 7.8 | 1.95 |
| P. vulgaris | 0.49 | 0.49 | 7.8 | 7.8 |
| Ps. aeruginosa | 3.9 | 3.9 | 62.5 | >125 |
| K. pneumoniae | 0.0075 | 0.245 | 7.8 | 0.245 |
| S. schottmulleri | 0.49 | 0.49 | 3.9 | 0.98 |
| E. typhosa | 0.49 | 0.49 | 7.8 | 3.9 |

Table II shows a similar experiment in which the organisms were grown in broth instead of being streaked on the surface of agar in Petri dishes, as in Table I. In general, larger quantities of the antibiotics were required to inhibit growth compared with the agar dilution method, particularly with respect to aureomycin and terramycin.

TABLE II

*Concentrations of antibiotics required to prevent growth of bacteria in liquid culture*

| Test Organism | Chlortetracycline | Oxytetracycline | Chloramphenicol | Thioaurin |
|---|---|---|---|---|
| | mcg./ml. | mcg./ml. | mcg./ml. | mcg./ml. |
| S. aureus | 3.125 | 12.5 | 25 | 25 |
| B. subtilis | 0.39 | 0.39 | 6.25 | 1.56 |
| E. coli | 1.56 | 12.5 | 25 | 25 |
| A. aerogenes | 1.56 | 12.5 | 50 | 25 |
| P. vulgaris | 1.56 | 12.5 | 25 | 25 |
| Ps. aeruginosa | 12.5 | 12.5 | >50 | 50 |
| K. pneumoniae | 3.125 | 12.5 | 25 | 25 |
| S. schottmulleri | 3.125 | 12.5 | 25 | 25 |
| E. typhosa | 3.125 | >12.5 | 25 | 25 |
| M. tuberculosis | 0.195 | 0.049 | 3.125 | 0.78 |

All tubes incubated at 37° C. for 20 hours.

The activity of most antibiotics is more or less adversely affected by the presence of blood serum. Many antibiotics have been reported which are completely inactive in the presence of serum and hence have no usefulness in vivo. The activity of thioaurin is not noticeably diminished in the presence of serum and in some cases the presence of serum increases the activity of the antibiotic. Thioaurin differs notably from chlortetracycline and oxytetracycline in this respect. Table III shows the relative activities of thioaurin and these other antibiotics in the presence and absence of 25% serum, using the agar dilution streak method.

TABLE III

*Concentrations of antibiotics required to prevent growth of bacteria on the surface of agar plates in the presence and absence of human serum*

| Test Organism | Chlortetracycline | | Oxytetracycline | | Chloramphenicol | | Thioaurin | |
|---|---|---|---|---|---|---|---|---|
| | Water, mcg./ml. | 25% Serum, mcg./ml. | Water, mcg./ml. | 25% Serum, mcg./ml. | Water, mcg./ml. | 25% Serum, mcg./ml. | Water, mcg./ml. | 25% Serum, mcg./ml. |
| S. aureus | 0.098 | 3.125 | 0.39 | 1.56 | 12.5 | 12.5 | 12.5 | 6.25 |
| B. subtilis | 0.098 | 1.56 | 0.39 | 1.56 | 3.125 | 3.125 | 12.5 | 6.25 |
| E. coli | 1.56 | 25 | 1.56 | 6.25 | 12.5 | 12.5 | 12.5 | 6.25 |
| A. aerogenes | 1.56 | 25 | 1.56 | 6.25 | 6.25 | 6.25 | 12.5 | 6.25 |
| P. vulgaris | 1.56 | 25 | 1.56 | 6.25 | 6.25 | 6.25 | 12.5 | 3.125 |
| Ps. aeruginosa | 25 | >100 | 12.5 | 100 | >100 | >100 | 100 | 100 |
| K. pneumoniae | 0.78 | 12.5 | 0.78 | 3.125 | 1.56 | 1.56 | 12.5 | 6.25 |
| S. schottmulleri | 0.78 | 12.5 | 0.78 | 6.25 | 3.125 | 3.125 | 12.5 | 3.125 |
| E. typhosa | 1.56 | 25 | 1.56 | 6.25 | 6.25 | 6.25 | 12.5 | 1.56 |
| M. tuberculosis | 0.049 | 0.78 | 0.098 | 0.78 | 6.25 | 6.25 | 12.5 | 6.25 |

That thioaurin is unaffected by even 50% of human serum is shown in Table IV, where the activities of the four antibiotics are compared in a broth dilution test. It will be observed that chlortetracycline was less active against *S. aureus* and *E. coli* in presence of 50% serum than it was in aqueous solution, whereas chloramphenicol, oxytetracycline, and thioaurin were unaffected.

TABLE IV

*Concentrations required to prevent growth of bacteria in liquid culture in the presence and absence of human serum*

| Sample | S. aureus 209-P | | E. coli 9637 | |
|---|---|---|---|---|
| | Water, mcg./ml. | 50% Serum, mcg./ml. | Water, mcg./ml. | 50% Serum, mcg./ml. |
| Chlortetracycline | 0.78 | 12.5 | 12.5 | 25 |
| Oxytetracycline | 25 | 50 | 50 | 50 |
| Chloramphenicol | 50 | 50 | 50 | 50 |
| Thioaurin | 25 | 25 | 12.5 | 6.25 |

Table V shows the relative activities of thioaurin, acetopyrrothine, and chlortetracycline in presence and absence of serum, using the agar plate dilution method. The activity of chlortetracycline was significantly decreased in the presence of serum, while that of acetopyrrothine remained substantially constant. The activity of thioaurin was at least as great in serum as in water and there are indications that it is even more active in serum.

TABLE V

| Test Organism | Thioaurin | | Acetopyrrothine | | Chlortetracycline | |
|---|---|---|---|---|---|---|
| | Water, mcg./ml. | 25% Serum, mcg./ml. | Water, mcg./ml. | 25% Serum, mcg./ml. | Water, mcg./ml. | 25% Serum, mcg./ml. |
| S. aureus | 12.5 | 6.25 | 1.56 | 3.12 | 0.195 | 6.25 |
| B. subtilis | 12.5 | 3.12 | 1.56 | 0.78 | 0.195 | 3.12 |
| E. coli | 12.5 | 3.12 | 3.12 | 6.25 | 1.56 | 25 |
| A. aerogenes | 12.5 | 6.25 | 12.5 | 12.5 | 1.56 | 25 |
| P. vulgaris | 12.5 | 3.12 | 3.12 | 3.12 | 1.56 | 25 |
| Ps. aeruginosa | 100 | 100 | 100 | 100 | 25 | >100 |
| K. pneumoniae | 12.5 | 0.39 | 1.56 | 0.78 | 0.39 | 0.78 |
| S. schottmulleri | 12.5 | 1.56 | 3.12 | 3.12 | 0.78 | 12.5 |
| E. typhosa | 12.5 | 1.56 | 3.12 | 3.12 | 1.56 | 25 |
| M. tuberculosis | 18 | 12.5 | 12.5 | 12.5 | 0.195 | 3.125 |

Incubated at 37° C. for 20 hours.

An aqueous solution of the crystalline form of thioaurin is not inactivated over a wide variation in pH value and temperature. For example, the stability of an aqueous solution containing mcg./ml. of crystalline material was studied by storing portions of the solution for various periods under different temperature and pH conditions. Filter paper discs were dipped in the various solution portions and then applied to agar plates seeded with the test organism. The plates were incubated for 20 hours at 28° C. and the zones of incubation were then measured. The following data were obtained:

| | E. coli plate | S. lutea plate |
|---|---|---|
| | mm. | mm. |
| Solution at 50 mcg./ml. | 29 | 37 |
| 4 hours room temperature, pH 3 | 29 | 37 |
| 4 hours room temperature, pH 6 | 30 | 37 |
| 4 hours room temperature, pH 9 | 29 | 36 |
| 24 hours room temperature, pH 3 | 28 | 37 |
| 24 hours room temperature, pH 6 | 28 | 37 |
| 24 hours room temperature, pH 9 | 28 | 35 |
| heated at 100° C. for 10 min., pH 3 | 28 | 36 |
| heated at 100° C. for 10 min., pH 6 | 28 | 36 |
| heated at 100° C. for 10 min., pH 9 | 27 | 35 |

The relative inertness of thioaurin to various inactivating agents is shown in Table V.

TABLE VI

*The sizes of zones of inhibition produced on agar plates seeded with S. lutea by solutions of thioaurin in contact with various inactivating agents*

| | Human Serum | Cysteine | Penicillinase | Control |
|---|---|---|---|---|
| 10 min | 33.0 | 33.3 | 32.0 | 34.5 |
| 30 min | 33.3 | 33.0 | 32.0 | 33.5 |

In this experiment, the solutions of the inactivators, cysteine 1 mg./ml.; human serum undiluted, and penicillinase (Difco-Penase) were mixed in equal volumes with stock solutions of partially purified thioaurin (1 mg./ml.) and held at room temperature. Aliquots were removed at 10 and 30 minutes and immediately applied to paper discs on agar plates seeded with *S. lutea*. The zones of inhibition were measured and compared with the untreated standard after 16 hours incubation.

The data show that human serum, cysteine, and penicillinase have no significant effect on the activity of thioaurin. As shown above, many antibiotics are less active in the presence of serum. Penicillin is inactivated by penicillinase, and many antibiotics, including penicillin and streptomycin, are inactivated by cysteine.

The antibiotic may be assayed microbiologically using *S. lutea* as the preferred test organism. The seed agar used in the paper disc-agar plate method has the following composition:

| | G. |
|---|---|
| Beef extract | 1.5 |
| Yeast extract | 3 |
| Casein digest | 4 |
| Peptone | 6 |
| Dextrose | 1 |
| Agar | 15 |

Water, 1 liter.

The assay is preferably conducted at pH 6.0–6.8. Alternatively *S. aureus* may be used as a test organism using the same method and medium as with *S. lutea*. Or, if desired, a satisfactory plate assay may be achieved by using *E. coli* on nutrient agar the composition of which is as follows:

| | G. |
|---|---|
| Beef extract | 3 |
| Peptone | 5 |
| Agar | 15 |

Water, 1 liter.

The slope dose response curve is very helpful in differentiating between the various antibiotics. For example, with pure antibiotics, not only will the size of the zone of inhibition per given concentration be different with different antibiotics, but also there will be a different response to change in zone size with pH. For example, basic antibiotics, like streptothricin, streptomycin, and neomycin, give larger zones of inhibition at pH 8 than at pH 6. Penicillin on the other hand produces a smaller zone at pH 8 than at pH 6. Chloramphenicol and acetopyrrothine, which are neutral chemical substances, give zones which are essentially constant in size regardless of pH. Oxytetracycline and chlortetracycline, although amphoteric antibiotics, both give larger zones at pH 6 than at pH 8. Table VII shows a comparison of the zone sizes produced at the same concentration by different antibiotics at various concentrations. It is seen that thioaurin belongs to the group of antibiotics which give larger zones at pH 6 than at pH 8.

TABLE VII

*Zone of inhibition produced by 10 gamma/ml. of antibiotic on agar plates seeded with S. lutea*

| | pH 6 | pH 7 | pH 8 |
|---|---|---|---|
| | mm. | mm. | mm. |
| Thioaurin | 27.5 | 21.5 | 16.5 |
| Acetopyrrothine | 28.7 | 27.7 | 27.0 |
| Chlortetracycline | 26.4 | 20.7 | |
| Oxytetracycline | 22.0 | 19.0 | 16.2 |
| Chloramphenicol | 18.2 | 17.5 | 18.8 |

The usefulness of thioaurin as an antifungal agent is illustrated by its action against *Chaetomium globosum* and *Myrothecium verrucaria*, two fungi which are very important in causing deterioration of textiles. These two fungi are widely used in evaluating fungicides useful in the field of fabric preservation. Both fungi are completely inhibited in liquid culture at a concentration of 1 to 10,000. Partial inhibiiton is obtained at 1 to 100,000.

In addition, a number of other fungi are also inhibited by thioaurin. For example, even in the presence of 10% blood, the following pathogenic yeasts and fungi are inhibited by orosomycin at concentrations of 1:1000: *Candida albicans, Trichophyton mentagrophytes, Microsporum fulvum, Crytococcus neoformans, Histoplasma capsulatum, Sporotrichun schenkii,* and *Blastomyces dermatitides*. These test were conducted by streaking the organisms on a blood agar base having a pH of 6.8 of the following composition:

| In fusion from minced beef heart | 500 g. |
|---|---|
| Tryptone | 10 g. |
| Sodium chloride | 5 g. |
| Agar-agar | 20 g. |
| Water | 1000 ml. |
| Whole blood base | 10% by volume. |

The compound was incorporated in the agar at the concentration mentioned.

Thioaurin is toxic when used parenterally, Approximate $LD_{50}$'s (mg./20 g. mouse) for this substance suspended in human plasma and administered subcutaneously and intravenously were 0.4 and 0.3 mg., respectively. A 7.7 kg. dog did not survive a 7.8 mg./kilo dose in the form of a human plasma suspension administered intraveneously. The compound of this invention has not yet been proved useful in human therapy.

To produce thioaurin, the orosomycin producing microorganism is grown aerobically in a suitable nutrient medium. Preferably and particularly for large scale production, fermentation is effected in deep tank culture. In preparing a medium suitable for the growth of the organism with the maximum production of thioaurin, it is necessary to provide an assimilable carbohydrate source, an assimilable nitrogen source, a source of sulfur, a source of phosphorus and sources of inorganic ions. In general, the assimilable carbon source is dextrose, supplied in one of its commercial forms, known as "cerelose." Different isolates and strains of the organism seem to vary somewhat in their nitrogen requirements. The first one isolated requires an inorganic source of nitrogen, such as ammonium sulfate or chloride. Other strains do better when complex nitrogenous substances, such as meat extract, peptone, or distillers' solubles, are added, with or without ammonium salts. Inorganic salts of phosphorus, such as the potassium phosphates, are adequate sources of this element, although the organism may obtain a certain amount from complex substances, such as meat extract, peptone, and distillers' solubles, when they are present. The element sulfur, which is a constituent of the molecule, may be supplied as sulfate ion from ammonium sulfate, although again a small amount is present in and available from the complex substances which also provide nitrogen and phosphorus, when they are present. Small amounts of other ions, such as magnesium, potassium, and chloride, are added if not provided by the addition of complex substances. The trace elements, such as copper, manganese, zinc, iron, cobalt, chromium, and others, which may be required in extremely small amounts, are provided as impurities in the other ingredients of the media, since they do not need to be highly purified, or they are present in the water used in making up the media.

EXAMPLE I

Surface growth from nutrient glucose agar slants was introduced into 100 ml. of a nutrient glucose broth and incubated 72 hours at 24–28° C. on a reciprocating shaker. The vegetative growth thus obtained was introduced at 5% levels aseptically into a sterile fermentation medium consisting of glucose 1.5%, NaCl 0.5%, Na citrate 0.1%, acetic acid 0.05%, $(NH_4)_2SO_4$ 0.33%, $MgSO_4 \cdot 7H_2O$ 0.025%, $K_2HPO_4$ 0.01%, $KH_2PO_4$ 0.01%, $CaCO_3$ 0.3%, and trace elements at $MnSO_4 \cdot 4H_2O$ 10 p. p. m., $ZnSO_4 \cdot 7H_2O$ 40 p. p. m., $K_2Cr_2O$ .016 p. p. m. Each 500-ml. flask contained 100 ml. of this medium.

The flasks were incubated for two days at 24.28° C. on a reciprocating shaking machine.

By the method of fermentation described above a broth demonstrating a 20 mm. zone on a plate seeded with *E. coli* was obtained.

EXAMPLE II

In another experiment the first generation inoculum was prepared as described in Example I and then used to inoculate the final or production fermentation medium which was composed of the following: honey 4%, NaCl 0.5%, Na citrate 0.2%, $(NH_4)_2SO_4$ 0.4%, $MgSO_4 \cdot 7H_2O$ 0.025%, $K_2HPO_4$ 0.02%, $KH_2PO_4$ 0.02%, $CaCO_3$ 0.6%, acetic acid 0.1%, and trace elements $MnSO_4 \cdot 4H_2O$ 10 p. p. m., $ZnSO_4 \cdot 7H_2O$ 40 p. p. m., and $K_2Cr_2O_7$ 0.016 p. p. m.

After incubation at 24–28° C. on a reciprocating shaker for two days a broth was obtained which demonstrated an 18 mm. zone on a plate seeded with *E. coli*.

EXAMPLE III

A medium for the propagation of mold growth to be used as an inoculum for the final fermentation tanks was prepared having the following composition:

|  | Percent |
|---|---|
| Glucose | 1.5 |
| Bacto-peptone | 1.0 |
| Beef extract | 0.3 |
| NaCl | 0.15 |
| $CaCO_3$ | 0.3 |

Flasks containing 100 ml. of the sterile medium were then inoculated with surface growth from tubes slanted with a semi-solid medium consisting of agar fortified with beef extract and bacto-peptone. After incubation for 48 hours on a reciprocating shaking machine at 24–27° C., the resulting vegetative mycelia was used to inoculate 400 ml. of the above described liquid medium in 2-liter Erlenmyer flasks which were also incubated for 2 days. In this manner, sufficient inoculum was prepared to provide a volume equal to from 3% to 6% of the liquid volume in the fermenter.

The composition of the fermentation medium used for the production of thioaurin was as follows: cerelose 1.5%, $(NH_4)_2SO_4$ 0.33%, NaCl 0.5%, sodium citrate 0.11%, $CaCO_3$ 0.32%, $MgSO_4 \cdot 7H_2O$ 0.027%, $KH_2PO_4$ 0.015%, $K_2HPO_4$ 0.015%, $MnSO_4 \cdot 4H_2O$ 10 p. p. m., $ZnSO_4 \cdot 7H_2O$ 40 p. p. m., $K_2Cr_2O_7$ 0.016 p. p. m. and acetic acid 0.05% (v./v.). Sixty liters of the above described medium were sterilized in 25-gallon stainless steel fermenters. When the fermentation medium was cooled to the desired temperature, 76–79° F., the previously described inoculum was aseptically introduced. Air was then introduced into the batch at a rate of 2.9 C. F. M., equivalent to an air volume to liquid volume ratio of 1.6. Agitation was provided by means of an impeller and adequate baffles. Excessive foaming during the course of the fermentation was controlled by the addition of sterile antifoam agents.

By the method of fermentation described above yields of thioaurin broth were obtained after 48 hours which inhibited the growth of *Escherichia coli* at broth dilutions of 1:64.

The concentration or isolation of thioaurin from culture broth or fluid can be carried out in many ways and the following procedure is illustrative:

In the recovery of thioaurin, the fermented broth is acidified, a filter aid added, and the whole filtered to remove the mycelia. The clear filtrate is then adjusted to a pH of 6 to 6.5 and exhaustively extracted with ethyl acetate. Inorganic salts can be added to the aqueous phase to increase the efficiency of the extraction. The efficiency of the extraction can also be increased by substituting n-butanol for the ethyl acetate, but the use of either an inorganic salt or n-butanol gives extracts containing a relatively larger amount of colored impurities. The solvent extract in any case is concentrated at 35–45° C. and under reduced pressure, and any solids that separate are removed by filtration. The concentrated extract can then be treated in any one of several ways including recrystallization to give semipurified or crystalline material. For example, the concentrated extract can be further purified by subjecting it to a 12-plate countercurrent distribution in funnels in the manner described by L. C. Craig, Journal Biological Chemistry, vol. 150, page 33 (1943). The system ethyl acetate-water at pH 6 has given excellent results. After distribution tubes 4–8 are pooled and concentrated to dryness. The solid residue is extracted with chloroform and the latter extract fed onto a column containing silica wet with chloroform. Development is first carried out with chloroform and then with ethyl acetate which removes a light yellow band. Water is then added to this solution and the ethyl acetate distilled off in vacuo when a brownish gum remains. The aqueous phase is decanted and cooled whereupon crystals of thioaurin separate. These crystals can be separated by filtration.

Alternatively the above sequence of steps can be reversed. That is, the concentrated ethyl acetate extract of broth can be first chromatographed on silica when it is found that development with a 4 to 1 mixture of ethyl acetate and methanol is necessary to remove the yellow band. Concentration of this eluate followed by distribution in the ethyl acetate-water at pH 6 system and then concentration of tubes 4–8 gives crystalline material. The concentration of the chromatography eluate can be also carried out in the presence of water, and thus chloroform can be substituted for ethyl acetate in the countercurrent distribution step.

Acid alumina (pH 6) dehydrated with methanol has been successfully used in the chromatography step in place of the silica.

With some culture fluids it has been possible to reduce the number of tubes in the countercurrent distribution purification to 8 with equally satisfactory results. It has been possible to obtain crystals even when one of the above steps has been omitted. For instance, crystals were obtained when a concentrated ethyl acetate extract of broth was submitted to a 12-tube distribution (ethyl acetate-water (pH 6) system) and the 4 center tubes concentrated in vacuo to a small volume. However, this behavior is the exception rather than the rule, and continued success with such short procedures probably depends on the nature of the impurities in the batch of culture fluid employed in the recovery operations.

A short and convenient procedure for the isolation of crude crystalline material which seems to lend itself to routine use has also been developed. This procedure involves concentration of the ethyl acetate extract of broth to a small volume in the presence of a small volume of water. After concentration the aqueous phase is separated, exhaustively extracted with chloroform, and the chloroform extract chromatographed on silica as described above.

It is also possible to take the aqueous phase and submit it to a 12-tube countercurrent distribution in either the ethyl acetate-water at pH 6 or chloroform-water at pH 6 when concentration of the center tubes also gives crystalline material. The crude crystalline material obtained by the above procedures can be further purified by recrystallization from ethyl acetate or rechromatography over silica.

EXAMPLE IV

Sixty pounds of ammonium sulfate were added to forty-eight liters of clarified culture broth and the pH adjusted to 6.5. Two successive extractions with 4 liters of ethyl acetate were then carried out and the extracts pooled and concentrated in vacuo at 35–40° C. to 80 ml. A 12-tube Craig countercurrent distribution (ethyl acetate-water pH 6 system) was then carried out on 35 milliliters of this concentrate. After distribution the contents of tubes 4, 5, 6, and 7 were combined, concentrated in vacuo at room temperature to 8 ml., and the concentrate lyophilized. The solids thus obtained were extracted with 25 ml. of chloroform and the solution added to a chromatographic column containing 80 g. silica gel (The Davison Chemical Corp., Grade 923, mesh 100–200) which had been slurried in chloroform prior to packing the column. A brown band formed at the top of the column. The column was washed with 450 ml. of chloroform when a yellow band separated, travelled down the column, and finally came off in the effluent. Development was then carried out with 2600 ml. of ethyl acetate. A greenish yellow band first separated and travelled down the column. This was followed by a yellow band containing the bulk of the activity. The yellow portion of the eluate was concentrated (in vacuo, room temperature) to 15 ml. and 20 ml. of water was added. Distillation was then continued until all the solvent had been removed. The aqueous supernatant was separated from the brownish gummy impurities and placed in the refrigerator overnight and yellow crystals of thioaurin appeared.

EXAMPLE V

Thirty-five milliliters of the concentrated ethyl acetate extract of broth prepared in Example I were added to a 90 g. silica column prepared as in the foregoing example. Development was first carried out with 310 ml. of chloroform when it was found that the yellow band that first separated and then finally emerged from the bottom of the column contained some of the bioactivity. The presence of bioactivity in this fraction of the eluate was due to the ethyl acetate which had been used in the column feed as further washing with the chloroform finally gave a colorless effluent. Development was then continued with 150 ml. of ethyl acetate when it seemed that the presence of 20% (by volume) of methanol in the ethyl acetate developer would increase the rate of development. Accordingly, development was carried out with 530 ml. of a 4 to 1 mixture of ethyl acetate and methanol. A brown yellow, a light yellow, and finally a yellow band separated and passed through the column. The brown yellow and light yellow portions of the effluent were combined (240 ml.), concentrated in vacuo at room temperature to a small volume, and then the concentrate made up to 25 ml. with ethyl acetate. This concentrate was then subjected to an 11-plate Craig countercurrent distribution (ethyl acetate-water pH 6 system). After the completion of the distribution the contents of tubes 5 and 6 were combined and concentrated to 25 ml. and the resulting aqueous solution placed in the refrigerator for several days when yellow needles separated. When tubes 4 and 7 were processed in the same manner similar results were obtained.

EXAMPLE VI

Fifty milliliters of a concentrated ethyl acetate extract of broth prepared as in Example I was submitted to an 11-plate Craig countercurrent distribution (ethyl acetate-water pH 6 system). After distribution the contents of tubes 3, 4, 5, 6, and 7 were combined and concentrated in vacuo at 30° C. to 9 ml. when yellow rod-like crystals separated.

EXAMPLE VII

One hundred and fifty milliliters of a concentrated ethyl acetate extract of culture fluid were concentrated in vacuo at room temperature to a small volume and 240 ml. of water added. Distillation was continued until all the solvent had been evaporated. The aqueous supernatant (240 ml.) was decanted and the gum dissolved in 230 ml. of ethyl acetate. The latter solution was extracted with a 100 ml. portion of water, and this extract was combined with the aqueous supernatant obtained above. The resulting solution was concentrated in vacuo at 40–45° C. to 20 ml. This aqueous concentrate was extracted with three 25-ml. portions of chloroform. The extracts were combined with a 25-ml. chloroform wash of the concentration flask.

This chloroform solution was then fed to a 150-g. silica gel column. Development was carried out with 3500 ml. of ethyl acetate. One brown and two yellow bands separated and passed through the column. The portion (1400 ml.) of the effluent containing the second yellow band was concentrated in vacuo at room temperature to a volume of a few milliliters when yellow crystals appeared. There were dried in a vacuum desiccator over anhydrous calcium chloride when 239 mg. was obtained.

EXAMPLE VIII

To 230 ml. of concentrated ethyl acetate extract of culture fluid was added an equal volume of water. The mixture was distilled in vacuo at room temperature until all of the solvent had evaporated. The aqueous supernatant was decanted from the brown gum and the pH adjusted to 6 by means of dilute aqueous sodium hydroxide. It was then subjected to an 11-plate Craig countercurrent distribution in the ethyl acetate-water pH 6 system. The contents of tubes 5, 6, 7, and 8 were combined and concentrated in vacuo at 35–40° C. to a volume of a few ml. when a brown gum separated. The aqueous supernatant was separated and the gum washed with several 5–8 ml. portions of water. The aqueous extracts and the aqueous supernatant were combined and allowed to stand when yellow crystalline solids separated. The residue brown gum also crystallized on standing but the crystals in this case were contaminated with a brownish gummy impurity.

We claim:

1. An antibacterial and antifungal substance effective in inhibiting the growth of Gram positive and Gram negative bacteria and fungi, the substance containing the elements carbon, hydrogen, nitrogen, oxygen, and sulfur, the substance having the calculated empirical formula of $C_7H_6N_2O_2S_2$ the crystals of the substance having refractive indices of $$\text{Alpha}=1.595\pm0.005$$
$$\text{Beta}=1.725\pm0.005$$
$$\text{Gamma}=71.80$$

a suspension of the crystals of the substance in neutral mineral oil exhibiting characteristic absorption bands in the infrared region of the spectrum, the peaks of the absorption bands being as follows expressed in microns: 7.62, 8.10, 8.30, 9.08, 9.40, 9.52, 10.00, 10.10, 10.26, 11.02, 12.18, 12.36, 12.78, 13.24, 14.10, 14.54, crystals of the substance in methanol exhibiting ultra violet absorption bands at 368 millimicrons and 232 millimicrons with extinction coefficients of 52.0 and 19.9 respectively, the substance being relatively insoluble in water with only about 0.25 mol. being dissolved per milliliter at 28° C., fairly soluble in methanol, only slightly soluble in ethyl acetate and having a solubility in chloroform of less than 1 mol./ml.

2. A composition containing at least 1 part per 10,000 of an antibacterial and antifungal substance effective in inhibiting the growth of Gram positive and Gram negative bacteria and fungi, the substance containing the elements carbon, hydrogen, nitrogen, oxygen, and sulfur, the substance having the calculated empirical formula of $C_7H_6N_2O_2S_2$ the crystals of the substance having refractive indices of $$\text{Alpha}=1.595\pm0.005$$
$$\text{Beta}=1.725\pm0.005$$
$$\text{Gamma}=71.80$$

a suspension of the substance in neutral mineral oil exhibiting characteristic absorption bands in the infrared region of the spectrum, the peaks of the absorption bands being as follows expressed in microns: 7.62, 8.10, 8.30, 9.08, 9.40, 9.52, 10.00, 10.10, 10.26, 11.02, 12.18, 12.36, 12.78, 13.24, 14.10, 14.54, crystals of the substance in methanol exhibiting ultra violet absorption bands at 368 millimicrons and 232 millimicrons with extinction coefficients of 52.0 and 19.9 respectively, the substance being relatively insoluble in water with only about 0.25 mol. being dissolved per milliliter at 28° C., fairly soluble in methanol, only slightly soluble in ethyl acetate and having a solubility in chloroform of less than 1 mol./ml.

3. A process for the production of thioaurin comprising introducing a culture of thioaurin producing microorganism, a strain of NRRL–2294, into an aqueous nutrient medium containing an assimilable source of carbohydrate, an assimilable source of nitrogen, and assimilable sources of both sulfur and phosphorus, fermenting the liquor under aerobic conditions, thereby producing a broth containing thioaurin.

4. The process of claim 3 wherein thioaurin is separated by extraction from the broth and subsequently recovered from the extract.

References Cited in the file of this patent

UNITED STATES PATENTS

| | | |
|---|---|---|
| 2,378,449 | Tishler | June 19, 1945 |
| 2,516,080 | Sobin | July 18, 1950 |
| 2,540,284 | Peck | Feb. 6, 1951 |

OTHER REFERENCES

Bolhofer et al., Abstract of Papers 12A, 122nd Meeting ACS, Atlantic City, 1952.

Eisenman et al., Antibiotics and Chemotherapy, April 1953, pp. 385–392.

Bolhofer et al., Antibiotics and Chemotherapy, April 1953, pp. 382–384.

Celmer et al., pp. 622 to 625 (page 625 is especially pertinent) Article in Antibiotics Annual 1953–1954, publ. 1953 by Medical Encyclopedia Inc.

Daksman: "Actinomycetes and Their Antibiotics," pp. 230–231, publ. 1953 by the Williams and Wilkins Co., Baltimore, Md.